US010739584B2

United States Patent
Rakshit et al.

(10) Patent No.: US 10,739,584 B2
(45) Date of Patent: Aug. 11, 2020

(54) PREDICTED NEED NOTIFICATION FOR AUGMENTED REALITY EYEGLASSES

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/192,444

(22) Filed: Nov. 15, 2018

(65) Prior Publication Data

US 2020/0159011 A1 May 21, 2020

(51) Int. Cl.
G09G 5/00 (2006.01)
G02B 27/00 (2006.01)
G06F 3/01 (2006.01)
G02B 27/01 (2006.01)
G06T 19/00 (2011.01)

(52) U.S. Cl.
CPC ..... G02B 27/0093 (2013.01); G02B 27/0172 (2013.01); G06F 3/013 (2013.01); G06T 19/006 (2013.01); G02B 2027/0178 (2013.01)

(58) Field of Classification Search
CPC ....... G06T 19/006; G06T 19/00; G06F 3/011; G02B 27/017; G02F 3/012
USPC ....................................... 345/633
See application file for complete search history.

(56) References Cited

U.S. PATENT DOCUMENTS

| 5,635,948 | A  | * | 6/1997  | Tonosaki ............... G06F 3/147 345/156 |
|-----------|----|---|---------|--------------------------------------------|
| 8,958,158 | B1 |   | 2/2015  | Raffle et al.                              |
| 9,030,404 | B2 |   | 5/2015  | Linsky et al.                              |
| 9,823,735 | B2 |   | 11/2017 | Spiessl et al.                             |
| 10,319,154| B1 | * | 6/2019  | Chakravarthula . G02B 27/0172              |
| 2003/0162562 | A1 |   | 8/2003  | Curtiss et al.                          |

(Continued)

FOREIGN PATENT DOCUMENTS

DE      102014225222 A1    12/2014

OTHER PUBLICATIONS

Anonymous, Wearable electronic device, Dec. 22, 2014.

(Continued)

*Primary Examiner* — Gordon G Liu
(74) *Attorney, Agent, or Firm* — Garg Law Firm, PLLC; Rakesh Garg; Brian Restauro

(57) ABSTRACT

From sensor data received from a set of sensors affixed to augmented reality (AR) glasses, position information of the AR glasses relative to a focal point of a user's eyes is derived. From the position information, a readiness state of the AR glasses is derived, the readiness state being a member of a set of states, states in the set of states being indicative of the AR glasses' availability to present AR content. From application usage information, the AR content is determined to be available for display on the AR glasses. Responsive to the AR content being available and the readiness state of the AR glasses being in at least one state in the first subset of states, the AR content is displayed using the AR glasses.

19 Claims, 8 Drawing Sheets

(56) References Cited

U.S. PATENT DOCUMENTS

| | | | |
|---|---|---|---|
| 2004/0104864 A1* | 6/2004 | Nakada | G02B 27/017 |
| | | | 345/8 |
| 2007/0281762 A1 | 12/2007 | Baros et al. | |
| 2011/0080289 A1 | 4/2011 | Minton | |
| 2013/0038510 A1 | 2/2013 | Brin et al. | |
| 2013/0198694 A1 | 8/2013 | Rahman et al. | |
| 2013/0257751 A1 | 10/2013 | Stafford | |
| 2015/0331241 A1 | 11/2015 | Haddick | |
| 2016/0209648 A1* | 7/2016 | Haddick | G02B 27/0093 |
| 2017/0163578 A1 | 6/2017 | Deluca et al. | |

OTHER PUBLICATIONS

Anonymous, Capacitive Face Cushion for Smartphone-Based Virtual Reality Headsets, Dec. 6, 2017.
Le, et al., Eye Blink Detection for Smart Glasses, IEEE International Symposium on Multimedia, 2013.
Weber et al., Towards Smart Notifications using Research in the Large, MobileHCI'15, Aug. 24-27, 2015, Copenhagen, Denmark.

* cited by examiner

US 10,739,584 B2

PREDICTED NEED NOTIFICATION FOR AUGMENTED REALITY EYEGLASSES

TECHNICAL FIELD

The present invention relates generally to a method, system, and computer program product for using augmented reality display. More particularly, the present invention relates to a method, system, and computer program product for predicted need notification for augmented reality eyeglasses.

BACKGROUND

In augmented reality (AR) applications, a user's perceptions of real-world objects are augmented by computer-generated perceptual information. Augmented reality rendering for display uses various technologies, such as optical projection systems, display screens, handheld devices, and display systems worn on the human body.

Augmented reality eyeglasses, also referred to as AR glasses, are one type of head-mounted AR display system. AR glasses resemble conventional eyeglasses used for vision correction, to dim bright sunlight, and for vision protection, and when being used are worn just like conventional eyeglasses. Conventional eyeglasses have glass or hard plastic lenses mounted in a frame that holds the lenses in front of a focal point of a user's eyes, typically using a bridge over the nose and arms which rest over the ears. AR glasses have a similar frame shape, and are similarly mounted in front of a focal point of a user's eyes, but the lenses themselves are optional. AR glasses also include a projector to project an AR display into a portion of the user's visual field. Often, AR glasses also include one or more cameras, to capture what the user is currently looking at in the real world, as well as additional sensors.

AR glasses are usable to display a wide variety of AR content—such as game characters, annotations related to real-world items around a user, notifications of incoming items such as messages or email, instructions related to a user's location (such as a location-based reminder or route navigation instructions), and the like. Typically AR glasses are paired with another device, such as a smartphone. In such a scenario, the AR glasses act as an auxiliary, displaying specialized AR content and reporting images of the user's real-world visual field in communication with applications executing on the main device. However, AR glasses with sufficient processing power and communications capability can also be used in a standalone mode, without requiring an additional device.

SUMMARY

The illustrative embodiments provide a method, system, and computer program product. An embodiment includes a method that derives, from sensor data received from a set of sensors affixed to augmented reality (AR) glasses, position information of the AR glasses relative to a focal point of eyes of a user. An embodiment derives, from the position information, a readiness state of the AR glasses, the readiness state being a member of a set of states, states in a first subset of the set of states being indicative of the AR glasses being ready to present AR content, and states in a second subset of the set of states being indicative of the AR glasses being unavailable to present the AR content. An embodiment determines, from application usage information, that the AR content is available for display on the AR glasses. An embodiment displays, responsive to the AR content being available and the readiness state of the AR glasses being in at least one state in the first subset of states, the AR content using the AR glasses.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
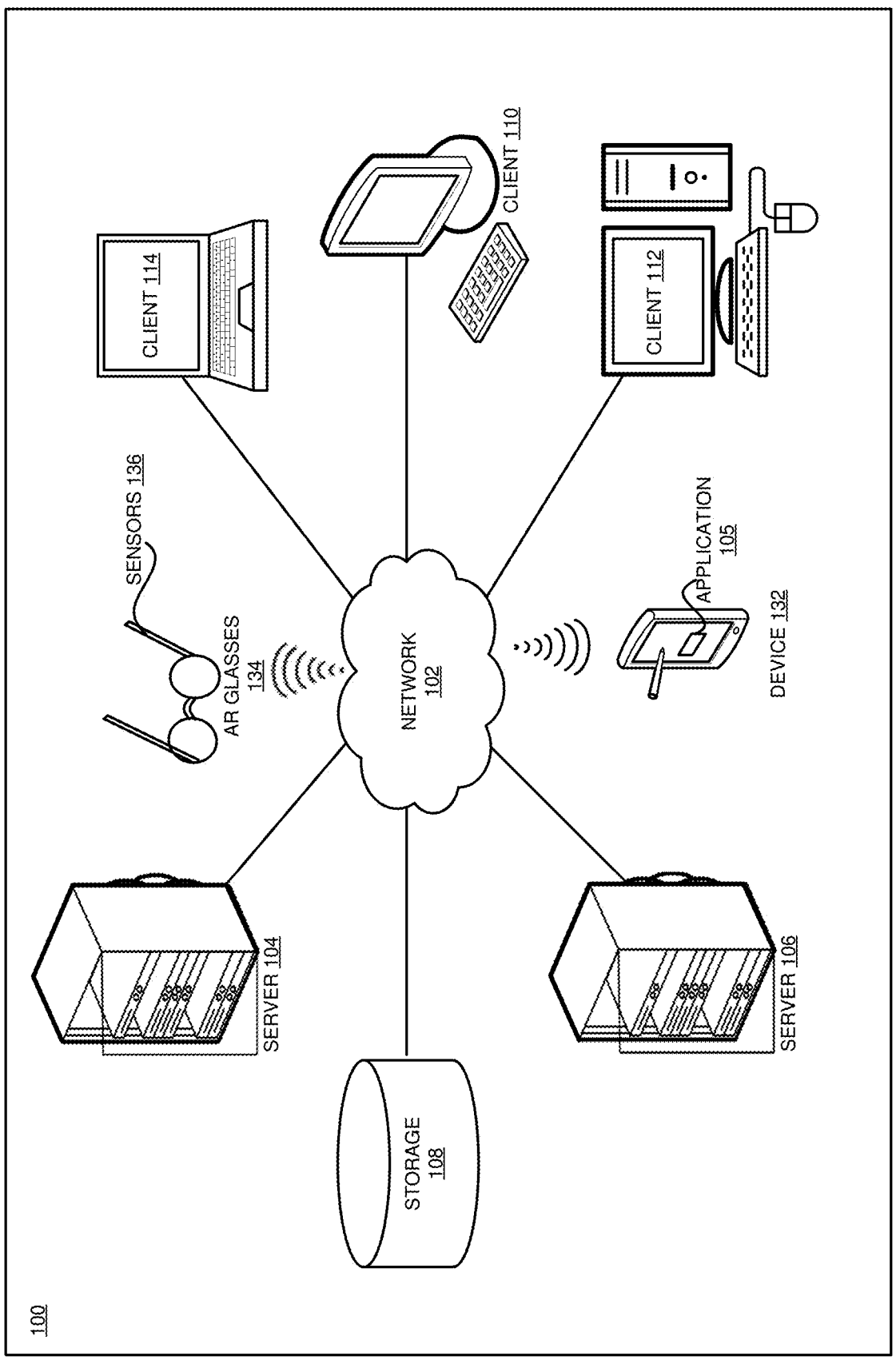
FIG. 1 depicts a block diagram of a network of data processing systems in which illustrative embodiments may be implemented.

The illustrative embodiments recognize that a user may not always wear AR glasses in the working position—in front of a focal point of a user's eyes, supported by the bridge of a user's nose and the tops of a user's ears—when the glasses are not being used. Instead, a user might wear AR glasses at different locations on his head, such as propped above his eyebrows on his forehead, propped on a top portion of his head, propped on the visor of a cap on the user's head, or propped on his ears facing the back of his head. Similarly, a user might wear AR glasses hung by an arm of the glasses on an article of clothing, such as the neckband or placket of a shirt, or through a belt loop. Additionally, a user may not wear AR glasses on his or her person. Instead, a user may keep the glasses in a case on a desk, in a pocket, or in a purse or briefcase. Glasses may also be left open, or partially open on a desk or other surface.

The illustrative embodiments recognize that whenever a user is not wearing the glasses in the working position, time elapses while a user recognizes that the glasses are needed, locates the glasses, puts them on, and performs any further activation that might be required before using the glasses to view information. Depending on where the glasses are located, the time required might range from several seconds to several minutes. In addition, at times the glasses might not be available or ready in time to use, or at all.

The illustrative embodiments further recognize that if the glasses are not ready or available, a decision must be made—whether to wait for the glasses to become available or to use an alternative solution for presenting the desired information. Such a decision can depend on the type of information to be presented, the time of the desired presentation, the quality of the desired presentation, or some combination thereof. For example, consider a navigation application and an upcoming turn. In such a case, a user would primarily prefer to receive the turn information before reaching the turn location, and the quality of information presentation and which device is used for information presentation are secondary. Another application, such as an AR-based game, might be less time-sensitive but include game features that can only be displayed on AR glasses. In such a case, a user might prefer to wait until the AR glasses are ready for presentation before playing the game.

The illustrative embodiments recognize that a need exists for timely detection of the availability and readiness of AR glasses for presenting content in conjunction with an AR-enabled application. A need also exists for predictively determining a future need for AR glasses and proactively locating the glasses, notification of the upcoming need therefor, configuring or making ready the AR glasses in advance of the upcoming need, or some combination thereof.

The illustrative embodiments recognize that the presently available tools or solutions do not address these problems and needs, or provide adequate solutions for these problems and needs. The illustrative embodiments used to describe the invention generally address and solve the above-described problems and other problems related to predicted need notification for augmented reality eyeglasses.

Generally, the illustrative embodiments predict an upcoming need for AR glasses by analyzing a set of dynamic factors, to wit, factors that are dependent not only on the content to be presented but also on time, location, hardware availability, personal limitations of the user, and many other factors—each of which is dynamic, i.e., changing according to the interdependencies between the factors. For example, the geographical location of the user where the information is to be presented may be suitable for using AR glasses at one time but not another, one time of day may be suitable for using AR glasses but not another, one device associated with the user at one time may be a suitable for alternative to AR glasses but not another device for the same content, one ambient light or noise level may be a suitable for alternative to AR glasses but not another level, and so on. One or more embodiments described herein operate to predict an upcoming need for AR glasses, predict or determine the suitability of AR glasses given the forecasted or present factors, proactively locate and ascertain the readiness state of the AR glasses, provide advance notification about the upcoming need and readiness, cause the AR glasses to become ready for timely presentation, determine and/or make ready an alternate method of presentation in consideration of certain factors, or cause some combination of these and other actions to occur, as described herein.

An embodiment can be implemented as a software application. The application implementing an embodiment can be configured as a modification of an existing AR glasses system, as a separate application that operates in conjunction with an existing AR glasses system, a standalone application, or some combination thereof.

Particularly, some illustrative embodiments provide a method by which position and readiness information for a user's AR glasses relative to the user is derived and used to notify the user of a predicted need for the glasses in time for a user to have the glasses ready for use.

An embodiment includes one or more sensors used to determine a position and orientation of AR glasses in relation to a user's face and body. Data from touch sensors on the arms of the glasses helps determine whether the arms are in contact with a user's temples or ears. Data from touch sensors on the bridge of the glasses helps determine whether the bridge of the glasses is in contact with the bridge of a user's nose.

A movement sensor—for example, an accelerometer—affixed to AR glasses detects movement. The size, rate, and regularity of detected movements, in combination, are indications that the glasses are being worn somewhere about a user's person. For example, as a user walks, her head also moves with each step. When a user sits and uses a computer, most of her body does not move, but her head may make smaller, irregular movements as she focuses on different parts of the computer's display screen or her attention is caught by a real-world event. Conversely, if no movement at all is detected, it is likely the glasses are not being worn but instead are stationary, for example on a piece of furniture.

In addition, an orientation sensor—for example, a gyroscope—affixed to AR glasses measures the orientation of the glasses, to determine whether both lenses are at the same height, or if the glasses are tilted in some way. A hinge sensor affixed to the AR glasses detects an angle between an arm of the glasses and the front portion of the frame, to determine whether the arm is in the open or closed position, or some intermediate position between open and closed. An ambient light sensor affixed to the AR glasses detects the amount of light present in the environment around the glasses. As well, additional sensors are possible and contemplated within the scope of the embodiments.

An embodiment monitors and analyzes data from any configured sensors, in combination. Using the sensor data, an embodiment derives a position and orientation of the glasses relative to a focal point of a user's eyes. In particular, from one set of sensor data—touch sensors on the arms indicating contact at a location consistent with a user's temples or ears, the hinge sensor indicating an angle consistent with the open position, the orientation sensor indicating an orientation consistent with facing straight ahead in front of a user's eyes, the movement sensor indicating a degree of movement within preset parameters corresponding to a user's small head movements, and the ambient light sensor indicating more than a threshold amount of light—an embodiment concludes that the AR glasses are likely being worn in the working position, on a user's head with the lenses in front of a user's eyes. From another set of sensor data—touch sensors on the arms indicating contact at a location inconsistent with a user's temples or ears, the hinge sensor indicating an angle consistent with the open position, the orientation sensor indicating an orientation consistent with being tilted up, the movement sensor indicating a degree of movement within preset parameters corresponding to a user's small head movements, and the ambient light sensor indicating more than a threshold amount of light—an embodiment concludes that the AR glasses are likely being worn raised up on the user's forehead, or propped on top of the user's head.

An embodiment also detects that the AR glasses are not on a user's head. From a third set of sensor data—the hinge sensor indicating an angle consistent with the closed position, the orientation sensor indicating an orientation consistent with being hung vertically, and the ambient light sensor indicating more than a threshold amount of light—an embodiment concludes that the glasses are likely being worn hung by an eyeglass arm on an article of clothing, such as the neckband or placket of a shirt, or through a belt loop. From a fourth set of sensor data—the hinge sensor indicating an angle consistent with the closed position, the movement sensor indicating no movements above a detection threshold, and the ambient light sensor indicating less than a threshold amount of light—an embodiment concludes that the glasses are likely folded, in a case, and not on the user's person. However, using another set of sensor data—the hinge sensor indicating an angle consistent with the closed position, the movement sensor indicating movements (within preset parameters consistent with movements of a user's body), and the ambient light sensor indicating less than a threshold amount of light—an embodiment concludes that the glasses are likely folded, in a case, but on the user's person—e.g., in a pocket or in a purse the user wears on her shoulder. Similarly, using another set of sensor data—the hinge sensor indicating an angle larger than a threshold consistent with the closed position, the movement sensor indicating no movements above a detection threshold, and the ambient light sensor indicating more than a threshold amount of light—an embodiment concludes that the glasses are likely at least partially unfolded on a stationary surface, such the user's desk.

An embodiment also uses sensor data to trigger a new determination of the AR glasses' position. If the movement sensor detects a one-time, comparatively fast movement that is above a threshold level of difference from the previously-detected small movements, the orientation sensor detects an orientation change above a preset threshold, or touch sensors change from indicating contact to not indicating contact or vice versa, such a change event triggers an embodiment to monitor sensor data to determine a new position of the glasses. For example, if the user was previously wearing the glasses, a comparatively fast movement was detected, and now touch sensors on the arms no longer indicate contact and the orientation sensor detects an orientation change above a preset threshold, an embodiment can conclude that a user has likely removed the glasses from her head.

An embodiment uses its determination of a position and orientation of the embodiment in relation to a user's face and body to categorize position and orientation information of the AR glasses into categories. One embodiment uses four categories: (i) ready (the user is wearing the glasses in the correct viewing position, positioned to see visual information, and configured to present any information the embodiment displays; (ii) conveniently located (the user is not currently wearing the glasses in the correct viewing position, but the glasses are in a convenient position for the user to put on and activate quickly—for example, propped on the user's head or hung on his shirt); (iii) less conveniently located (the glasses are located further from a user, such as in a case in a pocket or purse) and/or not configured to begin presenting visual information; and (iv) unavailable or unknown configuration state (the user does not have the glasses close enough at hand to be used). Another embodiment categorizes position and orientation information of the AR glasses into categories based on distance from the ready position. Another embodiment categorizes position and orientation information of the AR glasses into categories based on time to readiness, the time expected for the user to reposition the glasses to the ready position. These categories are to be considered non-limiting examples, and more or fewer categories, indicating more or fewer levels of convenience, distance, or time, are also contemplated within the scope of the illustrative embodiments. It is also conceivable that there could be multiple states of readiness and multiple states in which the glasses could be unavailable to display content. An embodiment is also configurable to use different distance or time thresholds dividing the categories. For example, in one implementation the threshold dividing the conveniently located and less conveniently located categories might be defined as ten seconds, while the threshold determining unavailability might be five minutes. In another implementation the threshold dividing the conveniently located and less conveniently located categories might be defined as thirty seconds, while the threshold determining unavailability might be ten minutes.

Based on the determined category, an embodiment determines whether to present information to the user using the AR glasses or using another method. If the user is already wearing the AR glasses, the embodiment simply presents new information to the user using the glasses. If the user has AR glasses sufficiently close to hand—for example, in the conveniently located category, the less conveniently located category, or in the less conveniently located category but involving important information or information that is best presented using AR glasses—the embodiment notifies the user to position the glasses for viewing, then presents the information to the user using the AR glasses. An embodiment performs the notification using any available hardware installed in the embodiment, such as vibrating the glasses, making a sound, or activating a light signal, if the glasses are so equipped. However, if an embodiment determines that AR glasses are not available, or not suitably equipped for notifications, the embodiment causes the information to be presented using another device, such as a smartphone or tablet, or another wearable device, that is available to the user.

As a user uses both AR glasses and any device a user uses with the AR glasses (such as a smartphone), an embodiment stores usage information associated with the user. Usage information includes applications the user interacts with using the AR glasses, information the user views on the AR glasses, information the user chooses to view on a device other than the AR glasses, as well as usage context information such as the user's location, time of day, day of week, and other information available from the user's other applications, accounts, or device profiles.

An embodiment analyzes the stored usage information to derive one or more usage patterns associated with a particular user. An embodiment conducts such analysis using a pattern recognition technique, such as a clustering analysis. Other techniques are also contemplated within the scope of the illustrative embodiments.

Usage patterns identify which applications and which types of applications a user uses in conjunction with AR glasses. Usage patterns also identify locations and circumstances in which a user uses AR glasses as opposed to a different device. Usage patterns also identify times of day and days of the week on which a user uses AR glasses as opposed to a different device. Usage patterns also identify whether or not an alternative device is available for AR content display, as well as other patterns associated with a user's use of AR glasses.

Usage patterns identifying which applications and which types of applications a user uses in conjunction with AR glasses help to distinguish situations when a user uses different applications, of the same type, differently. For example, one user might choose to view AR content from all navigation applications using the AR glasses. Another user might view the output of only one navigation application using the AR glasses, and view the output of another navigation application using a different device such as a smartphone, because that user finds the format of the second application's AR glasses display distracting.

Usage patterns identifying locations and other circumstances in which a user uses AR glasses help to distinguish situations when a user prefers to use AR glasses from those when a user prefers a different device. For example, one user might choose to view the output of a navigation application on the AR glasses, but only on weekends when walking in a different city than where she lives. When this user uses the navigation application in her home city, she is also driving, and prefers to have another device speak navigation instructions to her instead. Another user might use AR glasses to view the output of a messaging application while in face-to-face meetings in his workplace (as indicated by data stored in the user's calendar application), but instead use his work computer to view the output of a messaging application while not in workday face-to-face meetings.

Usage patterns also associate a readiness state of the AR glasses with a user's AR glasses usage. For example, one user might only use AR glasses to view content if the glasses are already in the ready position. If this user does not have the glasses in the ready position—instead, they are in a different position, such as hanging on his shirt or in his pocket in a case—he does not put the glasses on, but instead views AR content using a different device. Another user might choose to use AR glasses to view content if the glasses are either in the ready position or in a convenient position. This user prefers to view AR content on the glasses if possible, and does not mind taking a small amount of extra time needed to remove the glasses from their convenient position and put them on.

As a user uses both AR glasses and any device a user uses with the AR glasses (such as a smartphone), an embodiment compares the user's current usage with previously-determined usage patterns. If the user's current activity matches a usage pattern including a use of AR content, an embodiment predicts that the user's current activity will also include AR content. In particular, an embodiment generates a prediction score and a confidence level for that prediction score, indicating a likelihood, and a confidence level for that likelihood, that the user's current activity will lead to an imminent use of AR glasses. For example, if the user has a known usage pattern of viewing the output of a navigation application on the AR glasses, but only on weekends when walking in a different city than where this user lives, and the user is using the navigation application on a Saturday (a weekend day) in a location within the city limits of New York City while the user's mailing address indicates a residence in Chicago (thus, in a different city), an embodiment could determine that the user has a prediction score of 90 (on a 0-100 scale) with an 85 percent confidence score of needing the AR glasses in one minute, to view navigation information indicating an upcoming turn. Similarly, if another user has a known usage pattern of viewing the output of a messaging application while in face-to-face meetings in her workplace, and it is Monday (a workday), the user is at a location corresponding to her work address, and her calendar indicates a meeting in a conference room, with other locally-based attendees, in five minutes, an embodiment could determine that the user has a prediction score of 95 (on a 0-100 scale) with an 90 percent confidence score of needing the AR glasses in five minutes, for use when the meeting starts.

If an embodiment determines an imminent (in less than a predetermined time threshold) need for AR glasses, the embodiment attempts to determine the location and position of the user's AR glasses, using the location and position determination described herein. If the AR glasses are currently positioned in the working position, in front of the user's eyes, the embodiment simply displays the AR content on the AR glasses.

If the AR glasses are not currently positioned in the working position, in front of the user's eyes, an embodiment generates a notification, timed according to the location of the AR glasses, to the user that AR glasses will soon be needed. The closer the glasses are to the working position, the shorter the notification time period, because it will take a user less time to reposition the glasses to the working position. If the glasses have been categorized to a category of conveniently located, an exemplary notification time might be ten seconds—allowing enough time for a user to move the glasses from propped on her forehead to the working position. If the glasses have been categorized to an intermediate category between conveniently and less conveniently located—for example, the glasses are hung through the neckband of a user's shirt—an exemplary notification time might be thirty seconds, allowing enough time for a user to unfold and don the glasses. If the glasses have been categorized to a category of less conveniently located—for example, the glasses are in a case in the user's pocket—an exemplary notification time might be two minutes, allowing enough time for a user to find, uncase, unfold, and don the glasses. These notification times are only examples, and other time periods are also contemplated within the scope of the exemplary embodiments.

In addition, if the glasses have been categorized as unavailable, an embodiment presents the information using an alternative device, if one is available, using an alternative form if appropriate to the alternative device.

An embodiment performs the notification using any suitable apparatus available on the glasses and any other available device. In particular, if the glasses are positioned to touch a user (for example, propped on her head), and the glasses are so equipped, an embodiment causes the glasses to vibrate. If the glasses are near a user (for example, hung from a shirt) and appropriately equipped, an embodiment causes the glasses to make a sound or emit a light signal. Other alert signals are also possible. If the glasses are not appropriately equipped to notify the user, or if the glasses do not appear to be positioned to notify the user, an embodiment notifies the user using an application executing on another available device, such as the user's smartphone. Such a smartphone notification may be a text notification—for example, "AR glasses will be needed in five minutes," optionally accompanied by a vibration, sound, light, or other alert signal.

In the technological field of endeavor of augmented reality, where information is presented using augmented reality devices, the manner of predicting a need for augmented reality wearable devices, and notification about the location and state of the needed augmented reality wearable device as described herein is unavailable. A method of an embodiment described herein, when implemented to execute on a device or data processing system, comprises substantial advancement of the functionality of that device or data processing system in determining a location of AR glasses relative to a user, predicting the user's need to use the AR glasses, and notifying the user to don the glasses in time to meet the predicted need.

The illustrative embodiments are described with respect to certain types of sensors, positions, orientations, usage patterns, forecasts, thresholds, validations, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
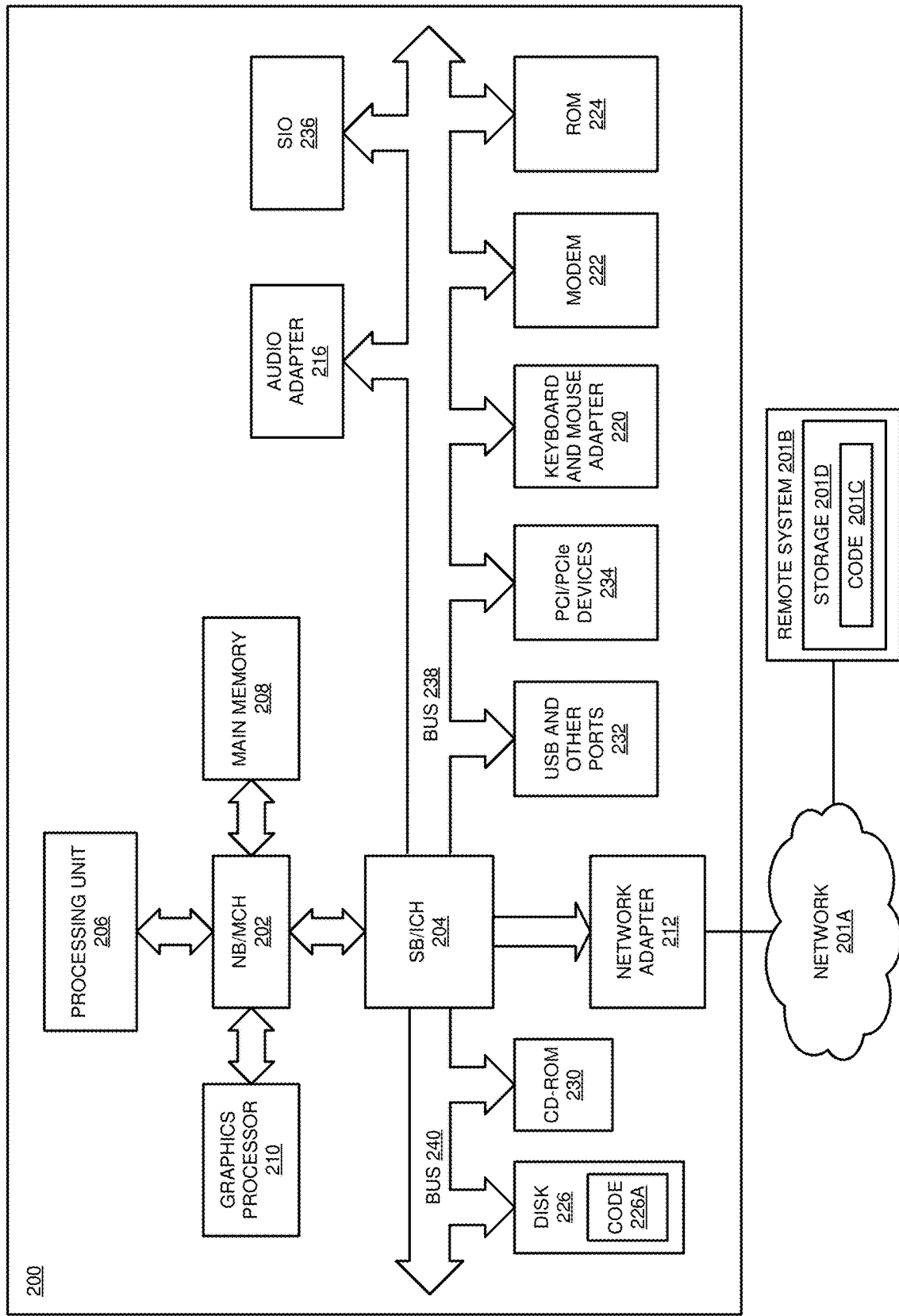
FIG. 2 depicts a block diagram of a data processing system.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

AR glasses 134 include sensors 136. AR glasses 134 are an example of an augmented reality display device described herein. Any software application described as executing in another data processing system in FIG. 1 can be configured to execute in AR glasses 134 in a similar manner. Any data or information stored or produced in another data processing system in FIG. 1 can be configured to be stored or produced in AR glasses 134 in a similar manner.

Application 105 implements an embodiment described herein. Application 105 executes in device 132 or any other suitable device, such as clients 110, 112, and 114. Application 105 communicates with AR glasses 134 to receive sensor data from sensors 136 and send information for display on AR glasses 134. Application 105 may also execute on AR glasses 134 in a standalone mode, without a need to communicate with an additional device such as device 132.

Servers 104 and 106, storage unit 108, and clients 110, 112, and 114, and device 132 and AR glasses 134 may couple to network 102 using wired connections, wireless communication protocols, or other suitable data connectivity. Alternatively, AR glasses 134 may not couple to network 102 directly, but instead communicate directly with device 132 or one or more of clients 110, 112, and 114. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
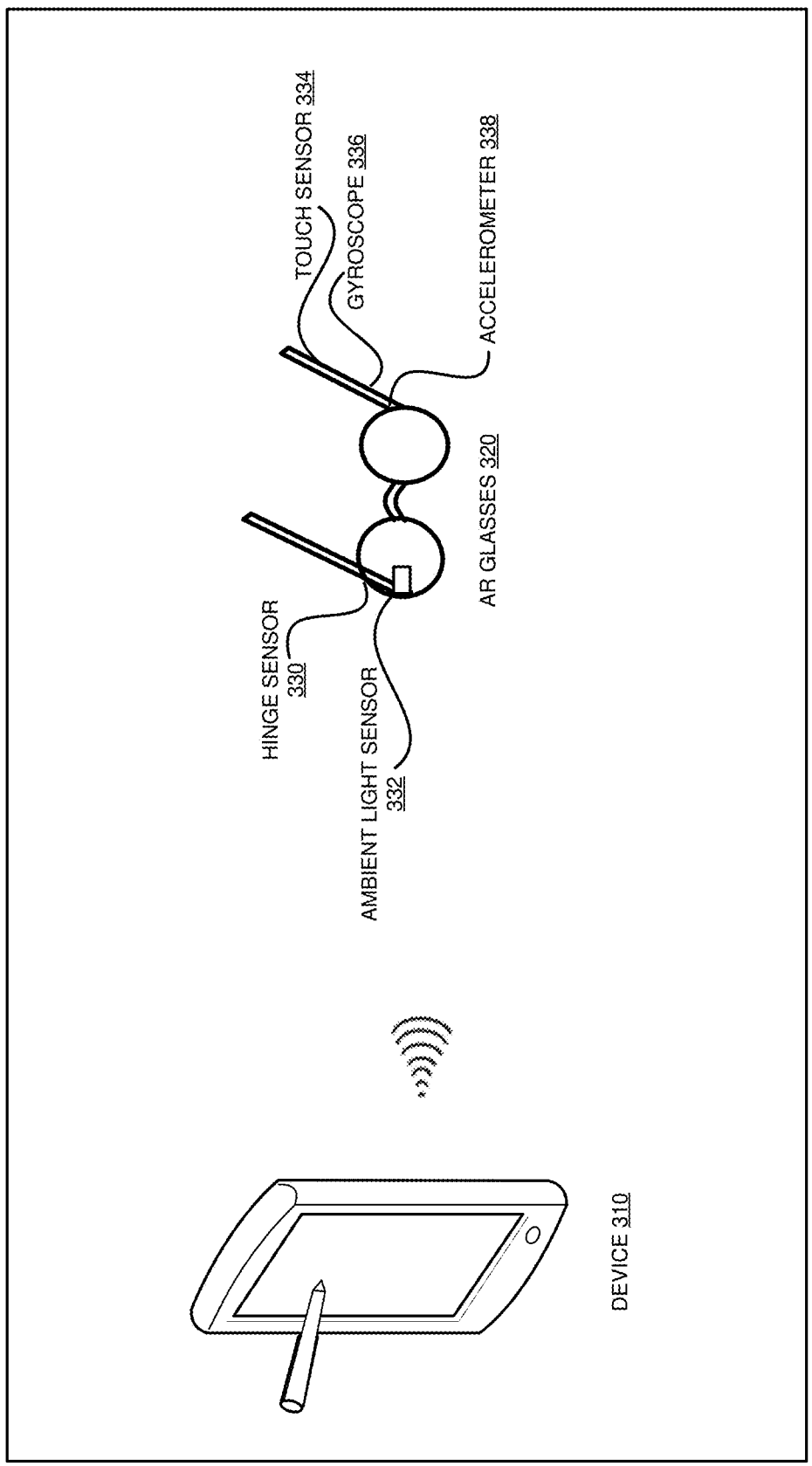
FIG. 3 depicts an example configuration for predicted need notification for augmented reality eyeglasses in accordance with an illustrative embodiment.

With reference to FIG. 3, this figure depicts an example configuration for predicted need notification for augmented reality eyeglasses in accordance with an illustrative embodiment. Device 310 is an example of device 132, and AR glasses 320 are an example of AR glasses 134 in FIG. 1.

AR glasses 320 include hinge sensor 330, ambient light sensor 332, one or more touch sensors 334, gyroscope 336, and accelerometer 338. Data from a touch sensor 334 affixed to an arm of AR glasses 320 helps determine whether the arm is in contact with a user's temple or ear. Data from a touch sensor 334 affixed to the bridge of AR glasses 320 helps determine whether the bridge is in contact with a user's nose. Accelerometer 338 affixed to AR glasses 320 detects movement. The size, rate, and regularity of detected movements, in combination, are indications that AR glasses 320 are being worn somewhere about a user's person. Conversely, if no movement at all is detected, it is likely that AR glasses 320 are not being worn but instead are stationary, for example on a piece of furniture. Gyroscope 336 affixed to AR glasses 320 measures the orientation of AR glasses 320, to determine whether both lenses are at the same height, or if AR glasses 320 are tilted in some way. Hinge sensor 330 affixed to AR glasses 320 detects an angle between an arm of AR glasses 320 and the front portion of the frame, to determine whether the arm is in the open or closed position, or some intermediate position between open and closed. Ambient light sensor 332 affixed to AR glasses 320 detects the amount of light present in the environment around AR glasses 320.

An application, for example application 105 in FIG. 1, executes on device 310 to communicate with AR glasses 320. The application receives sensor data from hinge sensor 330, ambient light sensor 332, one or more touch sensors 334, gyroscope 336, and accelerometer 338 and sends information for display on AR glasses 320.

Figure 4:
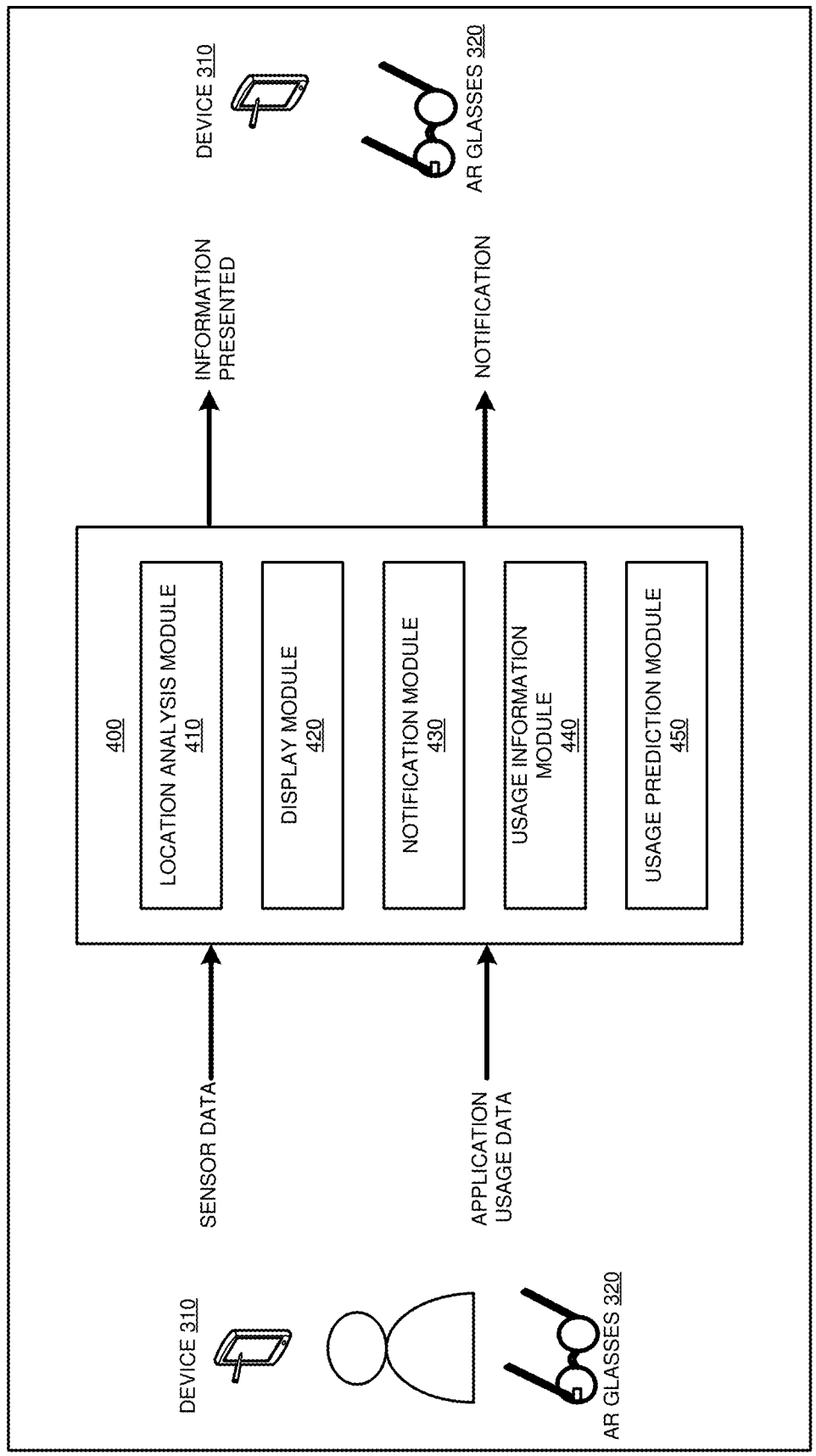
FIG. 4 depicts a block diagram of an example configuration for predicted need notification for augmented reality eyeglasses in accordance with an illustrative embodiment.

With reference to FIG. 4, this figure depicts a block diagram of an example configuration for predicted need notification for augmented reality eyeglasses in accordance with an illustrative embodiment. Application 400 is an example of application 105 in FIG. 1 and executes in device 310 or AR glasses 320 in FIG. 3.

Position analysis module 410 monitors and analyzes data from the sensors in AR glasses 320. Using the sensor data, position analysis module 410 derives a position and orientation of AR glasses 320 relative to a focal point of a user's eyes. In particular, from one set of sensor data—touch sensors 334 on the arms indicating contact at a location consistent with a user's temples or ears, hinge sensor 330 indicating an angle consistent with the open position, gyroscope 336 indicating an orientation consistent with facing straight ahead in front of a user's eyes, accelerometer 338 indicating a degree of movement within preset parameters corresponding to a user's small head movements, and ambient light sensor 332 indicating more than a threshold amount of light—position analysis module 410 concludes that AR glasses 320 are likely being worn in the working position, on a user's head with the lenses in front of a user's eyes. From another set of sensor data—touch sensors 334 on the arms indicating contact at a location inconsistent with a user's temples or ears, hinge sensor 330 indicating an angle consistent with the open position, gyroscope 336 indicating an orientation consistent with being tilted up, accelerometer 338 indicating a degree of movement within preset parameters corresponding to a user's small head movements, and ambient light sensor 332 indicating more than a threshold amount of light—position analysis module 410 concludes that AR glasses 320 are likely being worn raised up on the user's forehead, or propped on top of the user's head.

Position analysis module 410 also detects that AR glasses 320 are not on a user's head. From a third set of sensor data—hinge sensor 330 indicating an angle consistent with the closed position, gyroscope 336 indicating an orientation consistent with being hung vertically, and ambient light sensor 332 indicating more than a threshold amount of light—position analysis module 410 concludes that glasses 320 are likely being worn hung by an eyeglass arm on an article of clothing, such as the neckband or placket of a shirt, or through a belt loop. From a fourth set of sensor data—hinge sensor 330 indicating an angle consistent with the closed position, accelerometer 338 indicating no movements above a detection threshold, and ambient light sensor 332 indicating less than a threshold amount of light—position analysis module 410 concludes that glasses 320 are likely folded, in a case, and not on the user's person. However, using another set of sensor data—hinge sensor 330 indicating an angle consistent with the closed position, accelerometer 338 indicating movements (within preset parameters consistent with movements of a user's body), and ambient light sensor 332 indicating less than a threshold amount of light—position analysis module 410 concludes that glasses 320 are likely folded, in a case, but on the user's person—e.g., in a pocket or in a purse the user wears on her shoulder.

Similarly, using another set of sensor data—hinge sensor 330 indicating an angle larger than a threshold consistent with the closed position, accelerometer 338 indicating no movements above a detection threshold, and ambient light sensor 332 indicating more than a threshold amount of light—position analysis module 410 concludes that glasses 320 are likely at least partially unfolded on a stationary surface, such the user's desk.

Position analysis module 410 also uses sensor data to trigger a new determination of the position of AR glasses 320. If accelerometer 338 detects a one-time, comparatively fast movement that is above a threshold level of difference from the previously-detected small movements, gyroscope 336 detects an orientation change above a preset threshold, or touch sensors 334 change from indicating contact to not indicating contact or vice versa, such a change event triggers position analysis module 410 to monitor sensor data to determine a new position of glasses 320. For example, if the user was previously wearing glasses 320, a comparatively fast movement was detected, and now touch sensors 334 on the arms no longer indicate contact and gyroscope 336 detects an orientation change above a preset threshold, position analysis module 410 can conclude that a user has likely removed the glasses from her head.

Position analysis module 410 categorizes position and orientation information of AR glasses 320. Module 410 uses four categories: (i) ready (the user is wearing AR glasses 320 in the correct viewing position, positioned to see any information application 400 displays; (ii) conveniently located (the user is not currently wearing AR glasses 320 in the correct viewing position, but AR glasses 320 are in a convenient position for the user to put on quickly—for example, propped on the user's head or hung on his shirt); (iii) less conveniently located (AR glasses 320 are located further from a user, such as in a case in a pocket or purse); and (iv) unavailable (the user does not have AR glasses 320 close enough at hand to be used). Time thresholds dividing one category from another are configurable.

Based on the determined category, application 400 determines whether information should be presented to the user using AR glasses 320 or using another method. If the user is already wearing AR glasses 320, display module 420 simply presents new information to the user using AR glasses 320. If the user has AR glasses 320 sufficiently close to hand—for example, in the conveniently located category, the less conveniently located category, or in the less conveniently located category but involving important information or information that is best presented using AR glasses 320—notification module 430 notifies the user to position AR glasses 320 for viewing, then display module 420 presents the information to the user using AR glasses 320. Notification module 430 performs the notification using any available apparatus included in AR glasses 320, such as vibrating AR glasses 320, making a sound, or activating a light signal, if AR glasses 320 are so equipped. However, if application 400 determines that AR glasses 320 are not available, or not suitably equipped for notifications, application 400 causes the information to be presented using device 310 instead.

As a user uses both AR glasses 320 and device 310, usage information module 440 collects and stores usage information associated with the user. Usage information includes applications the user interacts with using AR glasses 320, information the user views on AR glasses 320, information the user chooses to view on device 310, as well as usage context information such as the user's location, time of day, day of week, and other information available from the user's other applications or accounts.

Usage prediction module 450 analyzes the stored usage information, using a clustering analysis, to derive usage patterns associated with a particular user, and compares current usage information for the user with the usage patterns. If the user's current activity matches a usage pattern including a use of AR content, usage prediction module 450 predicts that the user's current activity will also include AR content. In particular, usage prediction module 450 generates a prediction score and a confidence level for that prediction score, indicating a likelihood, and a confidence level for that likelihood, that the user's current activity will require an imminent use of AR glasses 320.

If usage prediction module 450 determines an imminent (under a predetermined threshold) need for AR glasses 320, location analysis module 410 attempts to determine the location and position of AR glasses 320. If AR glasses 320 are currently positioned in the working position, in front of the user's eyes, display module 420 simply displays the AR content on AR glasses 320. If AR glasses 320 are not currently positioned in the working position, in front of the user's eyes, notification module 430 generates a notification, timed according to the location of AR glasses 320, to the user that AR glasses 320 will soon be needed. The closer AR glasses 320 are to the working position, the shorter the notification time period, because it will take a user less time to reposition AR glasses 320 to the working position. If AR glasses 320 have been categorized as unavailable, application 400 presents the information using an alternative device such as device 410 instead.

Figure 5:
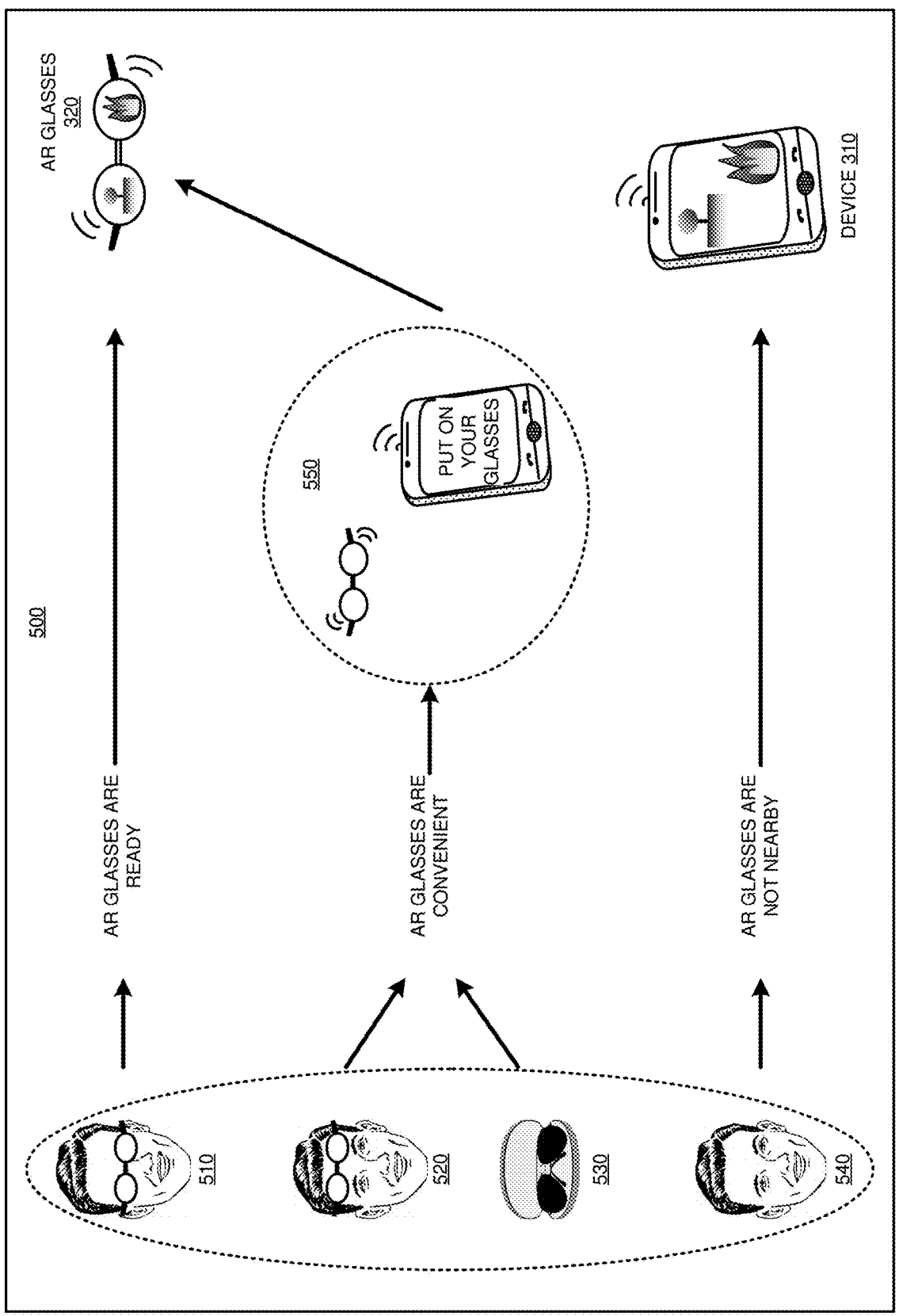
FIG. 5 depicts an example of need notification for augmented reality eyeglasses in accordance with an illustrative embodiment.

With reference to FIG. 5, this figure depicts an example of need notification for augmented reality eyeglasses in accordance with an illustrative embodiment. FIG. 5 depicts an example of the actions of application 400 in FIG. 4. Device 310 and AR glasses 320 are the same as device 310 and AR glasses 320 in FIG. 3.

State 510 depicts the user wearing AR glasses 320 in the working position, in front of the focal point of the user's eyes. Application 400 determines that AR glasses 320 are ready for use, and displays AR content on AR glasses 320.

State 520 depicts the user wearing AR glasses 320 propped on his forehead, above the working position. Application 400 determines that AR glasses 320 are in a convenient location and notifies the user (state 550) to put on AR glasses 320 by vibrating AR glasses 320 or displaying a message on device 310. If the user complies, application 400 proceeds to display AR content on AR glasses 320.

State 530 depicts AR glasses 320 folded in a case. Application 400 determines that AR glasses 320 are near the user, still in a convenient location, and notifies the user (state 550) to put on AR glasses 320 by vibrating AR glasses 320 or displaying a message on device 310. If the user complies, application 400 proceeds to display AR content on AR glasses 320.

State 540 depicts the user not wearing AR glasses 320. Application 400 determines that AR glasses 320 are not nearby, and displays AR content on device 310 instead.

Figure 6:
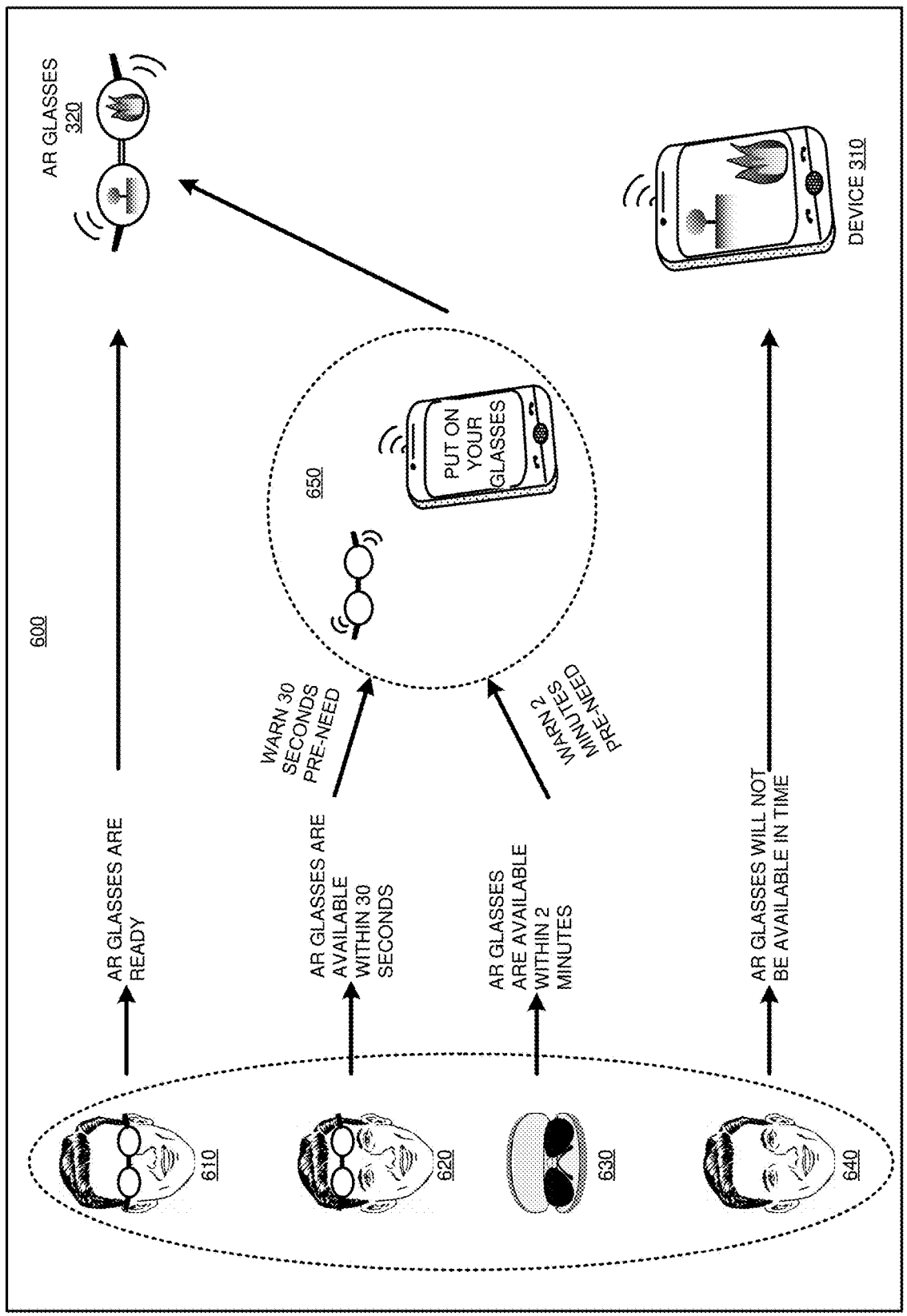
FIG. 6 depicts an example of predicted need notification for augmented reality eyeglasses in accordance with an illustrative embodiment.

With reference to FIG. 6, this figure depicts an example of predicted need notification for augmented reality eyeglasses in accordance with an illustrative embodiment. FIG. 6 depicts an example of the actions of application 400 in FIG. 4. Device 310 and AR glasses 320 are the same as device 310 and AR glasses 320 in FIG. 3.

State 610 depicts the user wearing AR glasses 320 in the working position, in front of the focal point of the user's eyes. Application 400 determines that, based on the user's application usage matching a usage pattern, a need to display AR content is upcoming. Because AR glasses 320 are ready for use, no timed notification is necessary, and application 400 displays AR content on AR glasses 320.

State 620 depicts the user wearing AR glasses 320 propped on his forehead, above the working position. Application 400 determines that, based on the user's application usage matching a usage pattern, a need to display AR content is upcoming. Because AR glasses 320 are in a convenient location and can be available within 30 seconds, 30 seconds before the AR content is predicted to be displayed application 400 notifies the user (state 650) to put on AR glasses 320 by vibrating AR glasses 320 or displaying a message on device 310. If the user complies, application 400 proceeds to display AR content on AR glasses 320.

State 630 depicts AR glasses 320 folded in a case. Application 400 determines that based on the user's application usage matching a usage pattern, a need to display AR content is upcoming. Because AR glasses 320 are still in a convenient location and can be available within two minutes, two minutes before the AR content is predicted to be displayed application 400 notifies the user (state 650) to put on the AR glasses by vibrating AR glasses 320 or displaying a message on device 310. If the user complies, application 400 proceeds to display AR content on AR glasses 320.

State 640 depicts the user not wearing AR glasses 320. Application 400 determines that based on the user's application usage matching a usage pattern, a need to display AR content is upcoming. However, AR glasses 320 are not nearby and will not be available in time, so application 400 displays AR content on device 310 instead.

Figure 7:
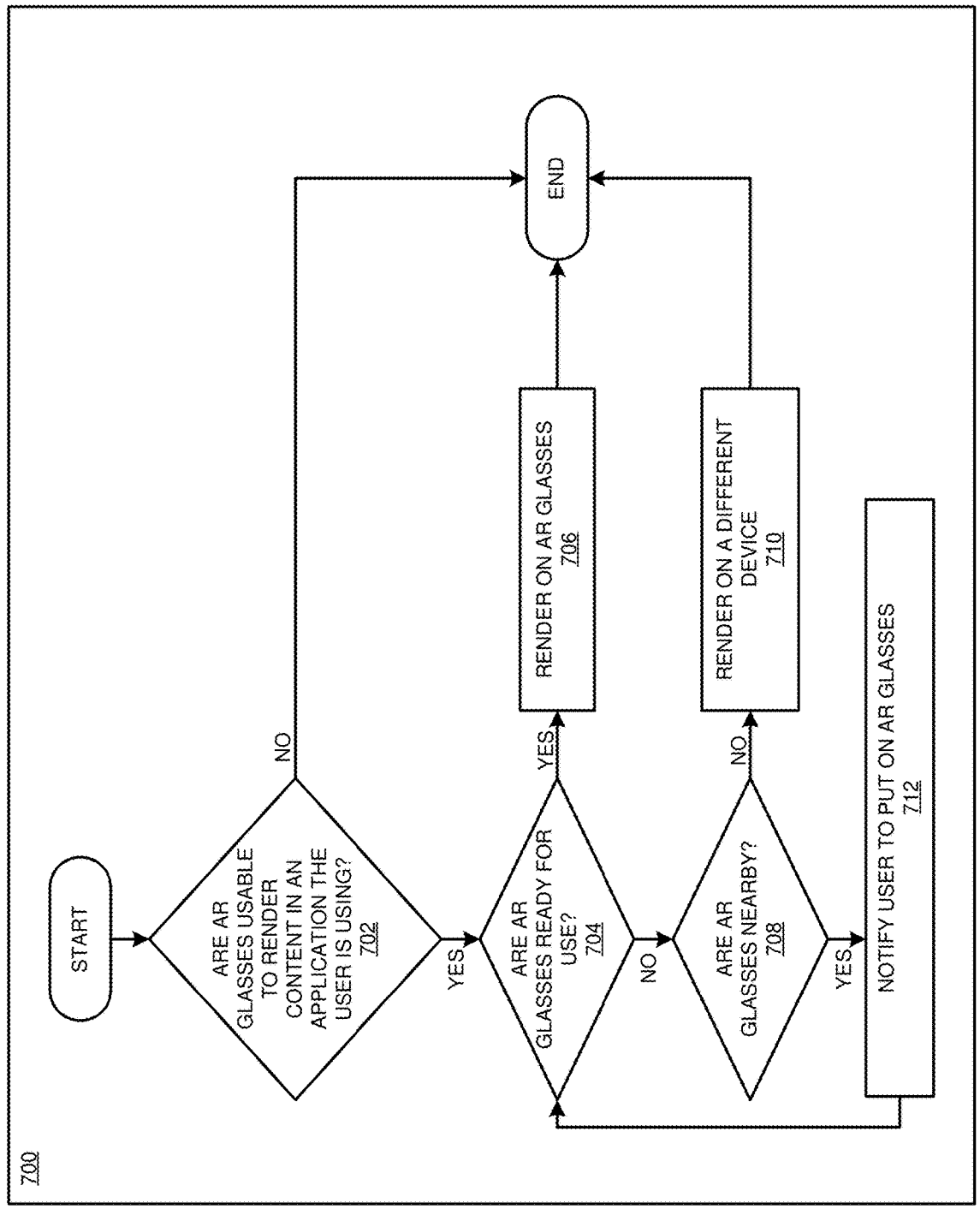
FIG. 7 depicts a flowchart of an example process for need notification for augmented reality eyeglasses in accordance with an illustrative embodiment.

With reference to FIG. 7, this figure depicts a flowchart of an example process for need notification for augmented reality eyeglasses in accordance with an illustrative embodiment. Process 700 can be implemented in application 400 in FIG. 4.

In block 702, the application determines whether AR glasses are usable to render content in an application a user is using. If not ("NO" path of block 702), the application ends. Otherwise ("YES" path of block 702), in block 704 the application uses derived position and orientation information to determine whether the AR glasses are ready for use. If so ("YES" path of block 704), in block 706 the application renders the content on the AR glasses, then ends. Otherwise ("NO" path of block 704), in block 708 the application uses derived position and orientation information to determine whether the AR glasses are nearby. If so ("YES" path of block 708), in block 712 the application notifies the user to put on the AR glasses, then returns to block 704 to check whether the user did so. Otherwise ("NO" path of block 708), in block 710 the application renders the content on a different device, then ends.

Figure 8:
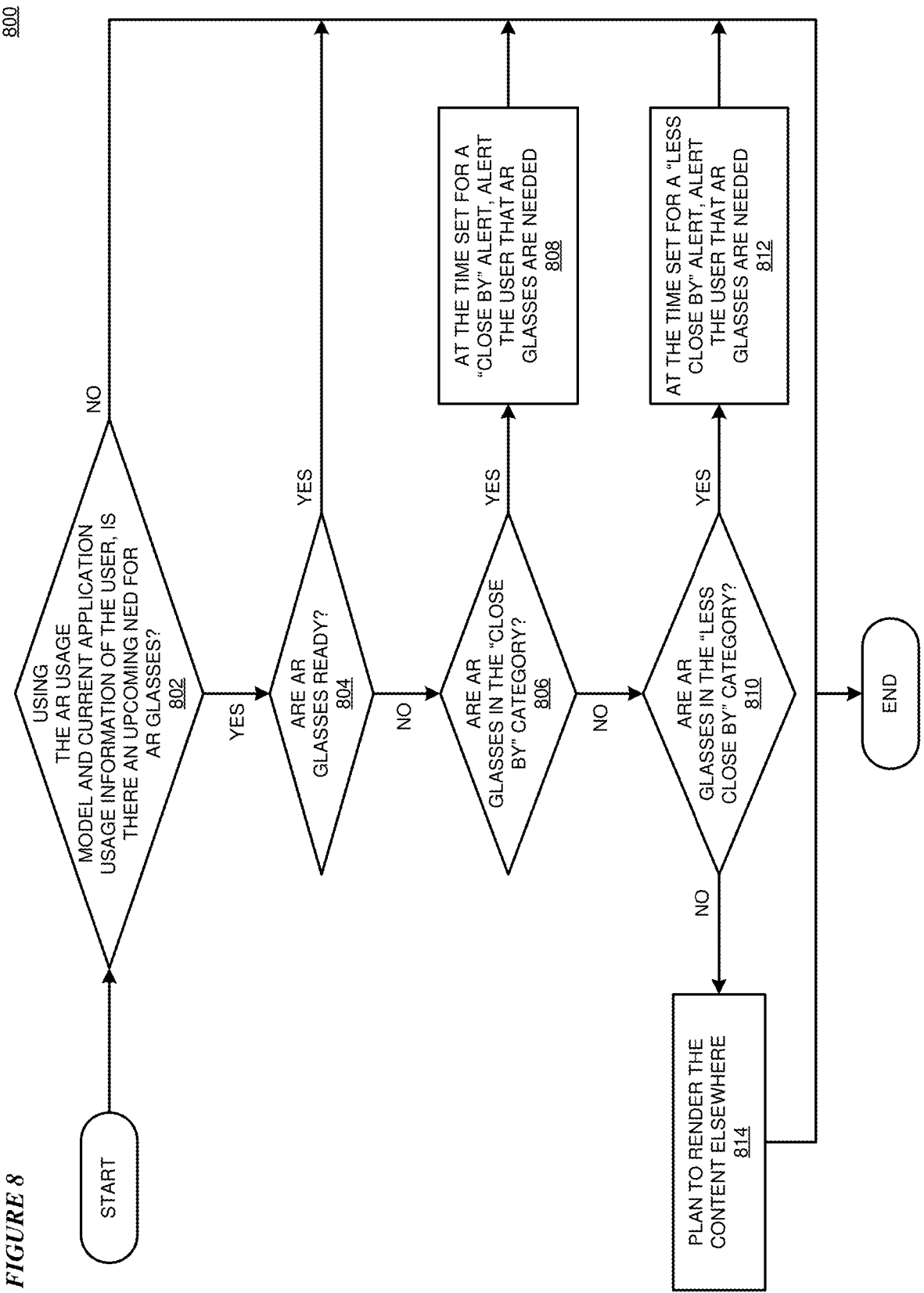
FIG. 8 depicts a flowchart of an example process for predicted need notification for augmented reality eyeglasses in accordance with an illustrative embodiment.

With reference to FIG. 8, this figure depicts a flowchart of an example process for predicted need notification for augmented reality eyeglasses in accordance with an illustrative embodiment. Process 800 can be implemented in application 400 in FIG. 4.

In block 802, the application determines whether, using a user's AR usage model and current application usage information, there is an upcoming need for AR glasses. If not ("NO" path of block 802), the application ends. Otherwise ("YES" path of block 802), in block 804 the application uses derived position and orientation information to determine whether the AR glasses are ready for use. If so ("YES" path of block 804), the application ends. Otherwise ("NO" path of block 804), in block 806 the application uses derived position and orientation information to determine whether the AR glasses have been categorized as close by. If so ("YES" path of block 806), in block 808, at the time set for a close by alert, the application notifies the user that AR glasses will be needed, then ends. Otherwise ("NO" path of block 806), in block 810 the application uses derived position and orientation information to determine whether the AR glasses have been categorized as less close by. If so ("YES" path of block 810), in block 812, at the time set for a less close by alert, the application notifies the user that AR glasses will be needed, then ends. Otherwise ("NO" path of block 810), in block 814 the application plans to render the content on a different device, then ends.

Thus, a computer implemented method, system or apparatus, and computer program product are provided in the illustrative embodiments for predicted need notification for augmented reality eyeglasses and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    deriving, from sensor data received from a set of sensors affixed to augmented reality (AR) glasses, position and orientation information of the AR glasses relative to a working position, the working position comprising a position in front of a focal point of eyes of a user;
    computing, using the position and orientation information, a distance of the AR glasses from the working position;
    deriving, from the position and orientation information and the distance, a readiness state of the AR glasses, the readiness state being a member of a set of states, states in a first subset of the set of states being indicative of the AR glasses being ready to present the AR content, and states in a second subset of the set of states being indicative of the AR glasses being unavailable to present the AR content;
    determining, from application usage information, that the AR content is available for display on the AR glasses; and
    notifying, responsive to the determining and the readiness state of the AR glasses being in at least one state in the second subset of states, the user that AR content is available for display.

2. The method of claim 1, wherein deriving, from the position and orientation information and the distance, a readiness state of the AR glasses comprises:
    categorizing the readiness state as a state in the first subset of states responsive to the distance being less than a first threshold.

3. The method of claim 1, wherein deriving, from the position and orientation information and the distance, a readiness state of the AR glasses comprises:

categorizing the readiness state as a state in a third subset of the set of states responsive to the distance being greater than a first threshold and less than a second threshold higher than the first threshold, wherein the third subset of states is a subset of the second subset of states, and wherein the third subset of states including a state indicative of an ability of the AR glasses to become available to present the AR content in a predetermined amount of time.

4. The method of claim 1, wherein deriving, from the position and orientation information and the distance, a readiness state of the AR glasses comprises:
categorizing the readiness state as a state in the second subset of states responsive to the distance being greater than the second threshold.

5. The method of claim 1, wherein deriving, from the position and orientation information and the distance, a readiness state of the AR glasses comprises:
deriving, from the position and orientation information and the distance, a time to readiness of the AR glasses, the time to readiness comprising a time taken to position the AR glasses in an AR content viewing position; and
categorizing the readiness state as a state in the first subset of states responsive to the time to readiness being less than a first threshold.

6. The method of claim 1, wherein deriving, from the position and orientation information and the distance, a readiness state of the AR glasses comprises:
deriving, from the position and orientation information and the distance, a time to readiness of the AR glasses, the time to readiness comprising a time taken to position the AR glasses in an AR content viewing position; and
categorizing the readiness state as a state in a third subset of the set of states responsive to the time to readiness being greater than a first threshold and less than a second threshold higher than the first threshold, wherein the third subset of states is a subset of the second subset of states, and wherein the third subset of states including a state indicative of an ability of the AR glasses to become available to present the AR content in a predetermined amount of time.

7. The method of claim 6, further comprising:
computing a notification time greater than the time to readiness; and
notifying, at the notification time, the user that AR content is available for display.

8. The method of claim 1, wherein deriving, from the position and orientation information and the distance, a readiness state of the AR glasses comprises:
deriving, from the position and orientation information and the distance, a time to readiness of the AR glasses, the time to readiness comprising a time taken to position the AR glasses in an AR content viewing position; and
categorizing the readiness state as a state in the second subset of states responsive to the time to readiness being greater than the second threshold, the readiness state.

9. The method of claim 1, further comprising:
displaying, responsive to the determining and the readiness state of the AR glasses being in at least one state in the second subset of states, AR content using a different device.

10. The method of claim 1, further comprising:
constructing, from a second application usage information and AR content usage information, an AR usage model comprising a usage pattern; and
predicting, using the AR usage model and the application usage information, an upcoming time at which a second AR content will be available for display.

11. A computer usable program product comprising one or more computer-readable storage devices, and program instructions stored on at least one of the one or more storage devices, the stored program instructions comprising:
program instructions to derive, from sensor data received from a set of sensors affixed to augmented reality (AR) glasses, position and orientation information of the AR glasses relative to a working position, the working position comprising a position in front of a focal point of eyes of a user;
program instructions to compute, using the position and orientation information, a distance of the AR glasses from the working position;
program instructions to derive, from the position and orientation information and the distance, a readiness state of the AR glasses, the readiness state being a member of a set of states, states in a first subset of the set of states being indicative of the AR glasses being ready to present the AR content, and states in a second subset of the set of states being indicative of the AR glasses being unavailable to present the AR content;
program instructions to determine, from application usage information, that the AR content is available for display; and
program instructions to notify, responsive to the determining and the readiness state of the AR glasses being in at least one state in the second subset of states, the user that AR content is available for display.

12. The computer usable program product of claim 11, wherein program instructions to derive, from the position and orientation information and the distance, a readiness state of the AR glasses comprises:
program instructions to categorize the readiness state as a state in the first subset of states responsive to the distance being less than a first threshold.

13. The computer usable program product of claim 11, wherein program instructions to derive, from the position and orientation information and the distance, a readiness state of the AR glasses comprises:
program instructions to categorize the readiness state as a state in a third subset of the set of states responsive to the distance being greater than a first threshold and less than a second threshold higher than the first threshold, wherein the third subset of states is a subset of the second subset of states, and wherein the third subset of states including a state indicative of an ability of the AR glasses to become available to present the AR content in a predetermined amount of time.

14. The computer usable program product of claim 11, wherein program instructions to derive, from the position and orientation information and the distance, a readiness state of the AR glasses comprises:
program instructions to categorize the readiness state as a state in the second subset of states responsive to the distance being greater than the second threshold.

15. The computer usable program product of claim 11, wherein program instructions to derive, from the position and orientation information and the distance, a readiness state of the AR glasses comprises:

program instructions to derive, from the position and orientation information and the distance, a time to readiness of the AR glasses, the time to readiness comprising a time taken to position the AR glasses in an AR content viewing position; and program instructions to categorize the readiness state as a state in the first subset of states responsive to the time to readiness being less than a first threshold.

16. The computer usable program product of claim 11, wherein program instructions to derive, from the position and orientation information and the distance, a readiness state of the AR glasses comprises:

program instructions to derive, from the position and orientation information and the distance, a time to readiness of the AR glasses, the time to readiness comprising a time taken to position the AR glasses in an AR content viewing position; and program instructions to categorize the readiness state as a state in a third subset of the set of states responsive to the time to readiness being greater than a first threshold and less than a second threshold higher than the first threshold, wherein the third subset of states is a subset of the second subset of states, and wherein the third subset of states including a state indicative of an ability of the AR glasses to become available to present the AR content in a predetermined amount of time.

17. The computer usable program product of claim 11, wherein the computer usable code is stored in a computer readable storage device in a data processing system, and wherein the computer usable code is transferred over a network from a remote data processing system.

18. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to derive, from sensor data received from a set of sensors affixed to augmented reality (AR) glasses, position and orientation information of the AR glasses relative to a working position, the working position comprising a position in front of a focal point of eyes of a user;

program instructions to compute, using the position and orientation information, a distance of the AR glasses from the working position;

program instructions to derive, from the position and orientation information and the distance, a readiness state of the AR glasses, the readiness state being a member of a set of states, states in a first subset of the set of states being indicative of the AR glasses being ready to present AR content, and states in a second subset of the set of states being indicative of the AR glasses being unavailable to present the AR content;

program instructions to determine, from application usage information, that the AR content is available for display; and program instructions to notify, responsive to the determining and the readiness state of the AR glasses being in at least one state in the second subset of states, the user that AR content is available for display.

\* \* \* \* \*